Patented Aug. 14, 1945

2,382,694

UNITED STATES PATENT OFFICE 2,382,694

LUBRICANT MANUFACTURE

Ralph E. Darley, Glen Burnie, Md., assignor to Standard Oil Development Company, a corporation of Delaware No Drawing. Application December 5, 1942, Serial No. 467,988

4 Claims. (Cl. 252—35)

This invention relates to lubricant manufacture and more especially to a novel process for manufacturing aluminum soap lubricating greases and to the resulting products.

Aluminum greases have heretofore been made chiefly by dissolving or dispersing an aluminum soap such as aluminum stearate or aluminum naphthenate in a suitable lubricating oil base stock with heat and, in the case of stearate soap, with subsequent setting to permit conversion of the mixture from a rubbery form to a grease having the desired gel structure, but that method is inconvenient, expensive and is not always attended with satisfactory results in regard to quality and uniformity of the product. It is one object of the present invention to provide a method of manufacturing aluminum greases which will be more economical and simpler or more fool-proof in obtaining a product of satisfactory and uniform quality.

Broadly, the invention comprises reacting hydrous aluminum hydroxide with a saponifiable material such as a fatty acid or naphthenic acid in the presence of mineral lubricating oil base stock, with or without the addition of more oil later, if desired.

The aluminum hydroxide to be used, should contain at least 75%, preferably about 80% to 95%, of water in a substantially homogenous form. In other words, the aluminum hydroxide used should not be a mixture of pure or anhydrous aluminum hydroxide with a mere addition of non-homogeneously admixed water but it should contain at least the indicated minimum amount of water in a more or less combined state. There are several such products on the market which are suitable, some being termed "gelatinous aluminum hydroxide" (which generally contains about 4.5% to 5.0% of aluminum and about 90% to 95% of water) and others being called "alumina hydrate pulp," or "alumina paste slurry," or "gelatinous alumina" (which generally contain about 8% of aluminum and about 80% to 85% of water). If desired, more water may be mixed with either of these types of products, but it is especially desirable in the case of the aluminum paste slurry to incorporate a sufficient amount of water to impart a gel-like consistency to the aluminum hydroxide. One type of gelatinous alumina available on the market, manufactured by the Aluminum Ore Company, and which may be utilized for the purposes of this invention, has the following identifying characteristics:

| | | |
|---|---|---|
| Aluminum hydroxide equivalent | percent | 15–16 |
| Total soda as $Na_2O$ | do | 0.1–0.3 |
| Sulfates as $SO_3$ | do | 0.01–0.02 |
| Organic matter | | Nil |
| Water | | Balance |
| pH | | 9–11 |
| Specific gravity | | 1.04–1.06 |
| Weight/cu. ft | lbs | 65–66 |

This same product is also available in a substantially neutral form, the soda having been neutralized by sulfuric acid, so that the final product contains about 0.3 to 0.5% sulfates as $SO_3$, and has a pH of about 7.0–7.5.

The saponifiable material to be saponified by the aluminum hydroxide may be any of those used in making aluminum greases. Stearic acid is suitable as well as other higher fatty acids, such as those obtained from various natural fats and oils, such as cottonseed oil acids, hydrogenated fish oil acids and naphthenic acids, especially those obtained from petroleum fractions such as kerosene, gas oil or higher fractions, as well as synthetically manufactured acids such as those made by the oxidation of paraffin wax. Although the invention is especially applicable to the saponification of acids, fats, e. g., tallow, etc., may also be saponified although somewhat higher temperatures are required. Mixtures of various types of acids or other saponifiable material may be used.

The mineral oil to be used as the lubricating oil base stock should preferably have a viscosity between the approximate limits of 40 to 85 seconds Saybolt Universal at 210° F., and may be obtained from any of the various commonly used crudes such as naphthenic, paraffinic, mixed base crudes, etc., and they may have been refined by various known methods such as distillation, clay treating, acid treating, solvent extraction, etc.

In carrying out the invention, it is preferred to use an amount of hydrous aluminum hydroxide which will substantially neutralize or substantially completely saponify the fatty or naphthenic acids used. It is desirable to carry out the saponification in the presence of an amount of lubricating oil base stock at least equal to the weight of acids used and preferably in the presence of an amount of oil equal to about 1 to 3 times the weight of the acids used. After the saponification has been completed by stirring and heating the mixture to the desired reaction temperature, i. e., about 200° F., and preferably at about 212° to 220° F., the mixture is then further heated to about 200° to 400° F., preferably at about 210° to 300° F., to drive off at least a major proportion of the free water originally present in the hydrous aluminum hydroxide as well as most of the water formed by the saponification reaction. The amount of water left in the finished aluminum grease should be less than about 0.10%, and preferably less than 0.05%. The soap content of the finished aluminum grease may vary over a fairly wide range depending upon the intended use of the product, but ordinarily will range between the approximate limits 1.5 to 25%, preferably to about 2 to 24% by weight. After the original saponification in the presence of part of the oil and subsequent heating to drive off the water, the balance of the lubricating oil base stock to be used is added with heating and stirring until the product is homogeneous.

It should be understood, of course, that other optional addition agents in the art of grease making may be used such as adhesivity agents or thickeners, such as polyisobutylene having a molecular weight above 1,000, especially above 30,000, oxidation inhibitors such as di-isobutyl phenol, etc., as well as dyes, lubricity agents, etc.

The invention may be carried out either by batch operation or continuously, as by continuously mixing and heating the saponifiable acid with the hydrous aluminum hydroxide and a small amount of lubricating oil base stock and continuously discharging into a drum kept under vacuum or by spraying a film upon a heated revolving surface, the dehydrated material being removed by scrapers.

Without intending to limit the invention to the specific ingredients and proportions used, the following experimental data are given to illustrate the preparation of aluminum greases both in small laboratory and larger plant batches. In these tests Oil A was an oil having a viscosity of about 50 seconds Saybolt at 210° F. and obtained from a naphthenic crude, whereas Oil B was a similar oil of 70 seconds viscosity, and Oil C was an oil having a viscosity of about 200 seconds Saybolt at 210° F. and derived from a naphthenic crude. The naphthenic acid used was obtained from a kerosene fraction of petroleum and had the following characteristics:

| | |
|---|---|
| Free acid calculated as oleic acid _____percent__ | 112.90 |
| Gravity _____ | 13.90 |
| Robinson color _____ | ¾ |
| Unsaponifiable _____percent__ | 4.39 |
| Saponification value _____ | 235.70 |
| Water _____percent__ | 0.70 |

The gelatinous aluminum hydroxide used contained about 4.9% aluminum or about 9.27% Al$_2$O$_3$ and 90.73% water. The aluminum paste slurry contained about 7.5% of aluminum or 14.20% Al$_2$O$_3$ and about 86.80% of water. Usually 10 parts by weight of water was added to every 10 parts by weight of aluminum paste slurry in order to convert the paste into a mass having a suitable gelatinous consistency. The aluminum paste slurry contained 7.5% of aluminum per 16.00% Al$_2$O$_3$ in about 80% of water.

These ten tests were all made in steam jacketed kettles equipped with mechanical paddle agitators. In most instances, as in Test No. 5, the original mixture of acid and the small amount of oil was heated to about 150° F. for ½ hour or an hour and then after addition of the aluminum hydroxide, the temperature was increased to about 260° F. or thereabouts and maintained there for about 4 hours until the contents were cooked substantially dry.

In all of the above tests, part of the oil was mixed with the acid and aluminum hydroxide during saponification, and the balance of oil was added later with thorough heating and mixing. The consistency test and the penetration, both unworked and worked, are the standard A. S. T. M. tests, the penetration tests being made at 77° F. After saponification, Tests 1 to 4 and 6 to 10 did not require any special treatment to obtain and stabilize the desired gel-like structure, but Test 5 did; this was done by passing it through chillers to obtain the gel structure.

Table

| | Test No. | | | | | | | | | |
|---|---|---|---|---|---|---|---|---|---|---|
| | 1 | 2 | 3 | 4 | 5 | 6 | 7 | 8 | 9 | 10 |
| LBS. OF MATERIALS USED | | | | | | | | | | |
| Oil: | | | | | | | | | | |
| A[1] | 32.70 | 12.44 | 21.12 | 45.10 | 3.50 | 6,444 | 10,283 | 4,331 | 9,485 | 10,300 |
| B | | | | | 17.00 | | | | | |
| C | | | | | 3.70 | | | | | |
| Acid: | | | | | | | | | | |
| Naphthenic | 1.75 | 1.75 | 1.75 | 1.75 | | 225 | 235 | 168 | 168 | 168 |
| Stearic | | | | | 1.75 | | | | | |
| Al hydrox.: | | | | | | | | | | |
| Gelatinous | 4.00 | 2.16 | 2.04 | | 1.41 | 168.5 | 390 | 150 | 200 | 230 |
| Paste | | | | 1.31 | | 146.0 | 390 | 150 | 200 | 230 |
| Water | | | | | | 22.5 | 24 | 17 | 17 | 17 |
| Glycerine | | | | | .07 | | | | | |
| Polyisobutylene | | | | | .07 | | | | | |
| Di-isobutyl phenol | | | | | .19 | | | | | |
| PRODUCT | | | | | | | | | | |
| Per cent soap (calcd.) | 4.94 | 14.79 | 8.71 | 4.21 | 7.00 | | | | | |
| S. I. L. consistency | 603 | 556 | 600 | 569 | | | | | | |
| A. S. T. M. penetration: | | | | | | | | | | |
| Unworked | | | | | 343 | | | | | |
| Worked | | | | | 384 | | | | | |
| [1] Oil present during saponification | 3.50 | 3.50 | 3.50 | 3.50 | 3.50 | 458 | 480 | 366 | 335 | 343 |

Both the five laboratory batches (Tests Nos. 1–5) and the five plant scale batches (Tests Nos. 6–10) resulted in aluminum soap greases of satisfactory quality. In general, their texture was smooth and homogeneous; Tests 1 and 10, exclusive of Test 5, were very clear, stringy and had stable consistencies. Test 5 was clear, stable in consistency and by desire had a buttery structure with stringiness. The product of Test 5, to which a small amount of polyisobutylene was added, showed substantially more stringiness or tackiness than the other compositions.

These tests show that surprisingly good results have been obtained in manufacturing an aluminum soap grease from hydrous aluminum hydroxide, whereas heretofore such greases had generally been made by dissolving an already-formed aluminum soap in a lubricating oil, and, on the other hand, anhydrous aluminum hydroxide cannot be used satisfactorily for making aluminum soap greases.

It is not intended that this invention be limited to the specific materials and proportions given for the sake of illustration but only by the appended claims in which it is intended to claim all novelty inherent in the invention as well as all modifications coming within the scope and spirit of the invention.

I claim:

1. The method of manufacturing an aluminum soap grease which comprises saponifying a saponifiable material with gelatinous hydrous aluminum hydroxide containing enough water to give it a gel-like consistency in the presence of at least an amount of lubricating oil equal to the volume of the saponifiable material.

2. The process of manufacturing an aluminum soap lubricating grease which comprises saponifying an acid selected from the group consisting of naphthenic acids and higher fatty acids with gelatinous hydrous aluminum hydroxide containing at least 75% of water in combined form in the presence of an amount of lubricating oil at least equal to the weight of the acid used, and heating the saponification mixture until substantially all the water has been driven off.

3. The process of manufacturing aluminum soap grease which comprises mixing together a saponifiable organic acid selected from the group consisting of naphthenic acids and higher fatty acids, an amount of lubricating oil at least equal to the weight of said acids, and an amount of gelatinous hydrous aluminum hydroxide containing about 4% to 5% of aluminum and containing about 90% of water, sufficient substantially completely to saponify the acid, heating the resulting mixture to about 200° to 400° F. until saponification has been completed and until substantially all water has been evaporated.

4. The process of manufacturing an aluminum soap lubricating grease which comprises mixing a saponifiable acid selected from the class consisting of naphthenic acids and higher fatty acids with an amount of lubricating oil equal to about 1 to 3 times the weight of acid, stirring and heating said mixture substantially completely to dissolve said acid in said oil, adding to the resulting mixture an amount of hydrous gelatinous aluminum hydroxide containing at least 75% of water in combined form sufficient substantially completely to saponify said acid, stirring and heating the mixture to a temperature of about 210° to 300° F. until saponification has been completed and substantially all water has been evaporated, adding with stirring and continued heating a further amount of lubricating oil to produce a composition having the desired final proportions of soap and oil, and cooling the resulting aluminum soap lubricating grease.

RALPH E. DARLEY.